US012393658B2

(12) United States Patent
Chu et al.

(10) Patent No.: US 12,393,658 B2
(45) Date of Patent: Aug. 19, 2025

(54) SYSTEM AND METHOD FOR AUTOMATICALLY UNLOCKING ELECTRONIC DEVICES (71) Applicant: GOOGLE LLC, Mountain View, CA (US)

(72) Inventors: Ping Tong Chu, Sunnyvale, CA (US); Chung Chun Wan, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 292 days.

(21) Appl. No.: 18/164,075

(22) Filed: Feb. 3, 2023

(65) Prior Publication Data
US 2024/0265079 A1 Aug. 8, 2024

(51) Int. Cl.
G06F 21/00 (2013.01)
G06F 21/32 (2013.01)
G06F 21/44 (2013.01)
G06V 40/18 (2022.01)

(52) U.S. Cl.
CPC .............. G06F 21/32 (2013.01); G06F 21/44 (2013.01); G06V 40/197 (2022.01); G06F 2221/2149 (2013.01)

(58) Field of Classification Search
CPC .. G06F 21/32; G06F 21/44; G06F 2221/2149; G06V 40/197
See application file for complete search history.

(56) References Cited

U.S. PATENT DOCUMENTS

| 2016/0117544 | A1 | 4/2016 | Hoyos et al. |
| 2018/0091303 | A1* | 3/2018 | Brook .................... G06K 19/10 |
| 2018/0234244 | A1* | 8/2018 | Starner ............... H04L 63/0861 |
| 2019/0332758 | A1 | 10/2019 | Yin et al. |
| 2020/0067710 | A1 | 2/2020 | Yildiz et al. |

OTHER PUBLICATIONS

"Researchers Develop a Low-Power Always-On Camera With Gesture Recognition", Phys. Org, Aug. 12, 2016, 3 pages.
Hersey, "Biometric Patents and Possibilities: Apple Universal Remote to AR/VR Headsets", Biometric Update.com, Jan. 4, 2022, 3 pages.

* cited by examiner

Primary Examiner — William A Corum, Jr.
(74) Attorney, Agent, or Firm — Brake Hughes Bellermann LLP (57) ABSTRACT An extended-reality device worn by a user may be configured to automatically perform the authentication necessary to unlock a user's device for use. The authentication may include using sensors on the extended-reality device to verify a user's identity. The authentication may further include capturing an image of the user's environment to detect a candidate device to be unlocked. After detecting the candidate device, the extended reality device may be configured to broadcast a signal to cause the candidate device to display a visual code if the candidate device is registered to the user. The extended-reality device may then capture one or more images of the visual code to determine an identity of the device. Using this identity, the extended reality device may then be configured to automatically unlock the device for use.

18 Claims, 10 Drawing Sheets

SYSTEM AND METHOD FOR AUTOMATICALLY UNLOCKING ELECTRONIC DEVICES

FIELD OF THE DISCLOSURE

The present disclosure relates to digital security and privacy and more specifically to a system and method for automatically unlocking one or more electronic devices for a user.

BACKGROUND

A user may be required to provide authentication to unlock a computing device multiple times in a given period. The high repetition of this procedure may be annoying to some users. Authentication requirements may be reduced for convenience, but this also reduces security.

SUMMARY

Disclosed herein are systems and methods that can make unlocking a device easier and more convenient for a user. A user may be identified by an extended-reality (XR) device worn by the user. After identification, the XR device may be configured to search for electronic devices that could be the user's (i.e., candidate devices). Once such a candidate device is found, the XR device can broadcast a code signal. The code signal can configure any, or all, devices registered to the user to visually display a visual code. If the XR device detects a visual code, it may determine which device of the user's is displaying the visual code and transmit an unlock signal to unlock the device.

In some aspects, the techniques described herein relate to a method implemented on an extended-reality device, the method including: verifying that a user, wearing the extended-reality device, is a registered user; detecting a candidate device in an area around the extended-reality device; broadcasting, in response to detecting the candidate device, a code signal, the code signal readable only by a registered device of the registered user and including a code for visual display on the registered device; detecting, after broadcasting the code signal, the visual display of the code on the candidate device to verify that the candidate device is the registered device; and transmitting, after verifying that the candidate device is the registered device, an unlock signal to enable the registered device for use.

In some aspects, the techniques described herein relate to an extended-reality device including: an eye-camera directed to an eye of a user; a world-camera configured directed to a field-of-view portion of an area around the extended-reality device; a low-range communication interface configured to transmit signals into the area around the extended-reality device; and a processor configured by software instructions to: sense that the user is wearing the extended-reality device; verify that the user, wearing the extended-reality device, is a registered user based on an eye-image from the eye-camera; detect a candidate device in the area around the extended-reality device based on a first world-image from the world-camera; configure the low-range communication interface to broadcast a code signal, the code signal readable only by a registered device of the registered user and including a code for visual display on the registered device; and detect, after broadcasting the code signal, the visual display of the code on the candidate device to verify that the candidate device is the registered device based on a second image from the world-camera.

In some aspects, the techniques described herein relate to a method for automatically unlocking a registered device using an extended-reality device, the method including: detecting a candidate device in an area around the extended-reality device using a world-camera of the extended-reality device; broadcasting, in response to detecting the candidate device, a code signal using a low-range communication interface of the extended-reality device; detecting, after broadcasting the code signal, a visual display of a code on the candidate device to verify that the candidate device is the registered device; and transmitting, after verifying that the candidate device is the registered device, an unlock signal to enable the registered device for use.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 3 is a flowchart for a method for automatically unlocking a device according to a possible implementation of the present disclosure.

The components in the drawings are not necessarily to scale relative to each other. Like reference numerals designate corresponding parts throughout the several views.

DETAILED DESCRIPTION

An electronic device (e.g., computer, laptop, tablet, mobile phone, home hub, smartwatch, smart TV, etc.) may require authentication of a user before the device is enabled for use (i.e., unlocked). Once authentication is obtained, access to the electronic device (i.e., device) may be based on its apparent use. When the apparent use is interrupted, a user may be required to reauthenticate. The authentication/reauthentication may include requiring a user to provide a single factor (e.g., password, pattern, or biometric, etc.). Further, to enhance the security an additional factor (e.g., one-time code, signal from a dongle, etc.) may be required for access. One problem facing electronic security is balancing the benefits of multi-factor authentication with the inconvenience it may impose on a user, especially when frequent re-authentication is required. The present disclosure addresses this technical problem by automatically authenticating a user and unlocking authorized devices for the user automatically in anticipation of their use. The disclosed approach may provide enhanced security while reducing the requirements on a user for authentication through the use of an extended-reality device worn by a user.

Extended reality (XR) is a group of technologies that allow for digital information to interact with the senses of a user in a realistic way. Extended-reality devices (i.e., XR devices) can be configured to (i) provide a user with additional information about a real environment (i.e., augmented reality (AR)), (ii) provide a user with a virtual environment (i.e., virtual reality (VR)), or (iii) some combination thereof (i.e., mixed reality (MR)). Accordingly, AR devices, VR devices, and MR devices may be generally referred to as XR devices.

XR devices can include sensors configured to detect/measure an action (e.g., movement) of a user in order to control one or more outputs to engage with senses (e.g., hearing, vision, tactile) of the user. For example, an XR device, worn on a head of a user, may include a sensor configured to measure movements of a head of the user, track an eye of a user, capture images of an environment of a user, and display images to the eye of the user. Additionally, the XR device may be configured to interact with other devices using a variety of communication protocols.

Figure 1:
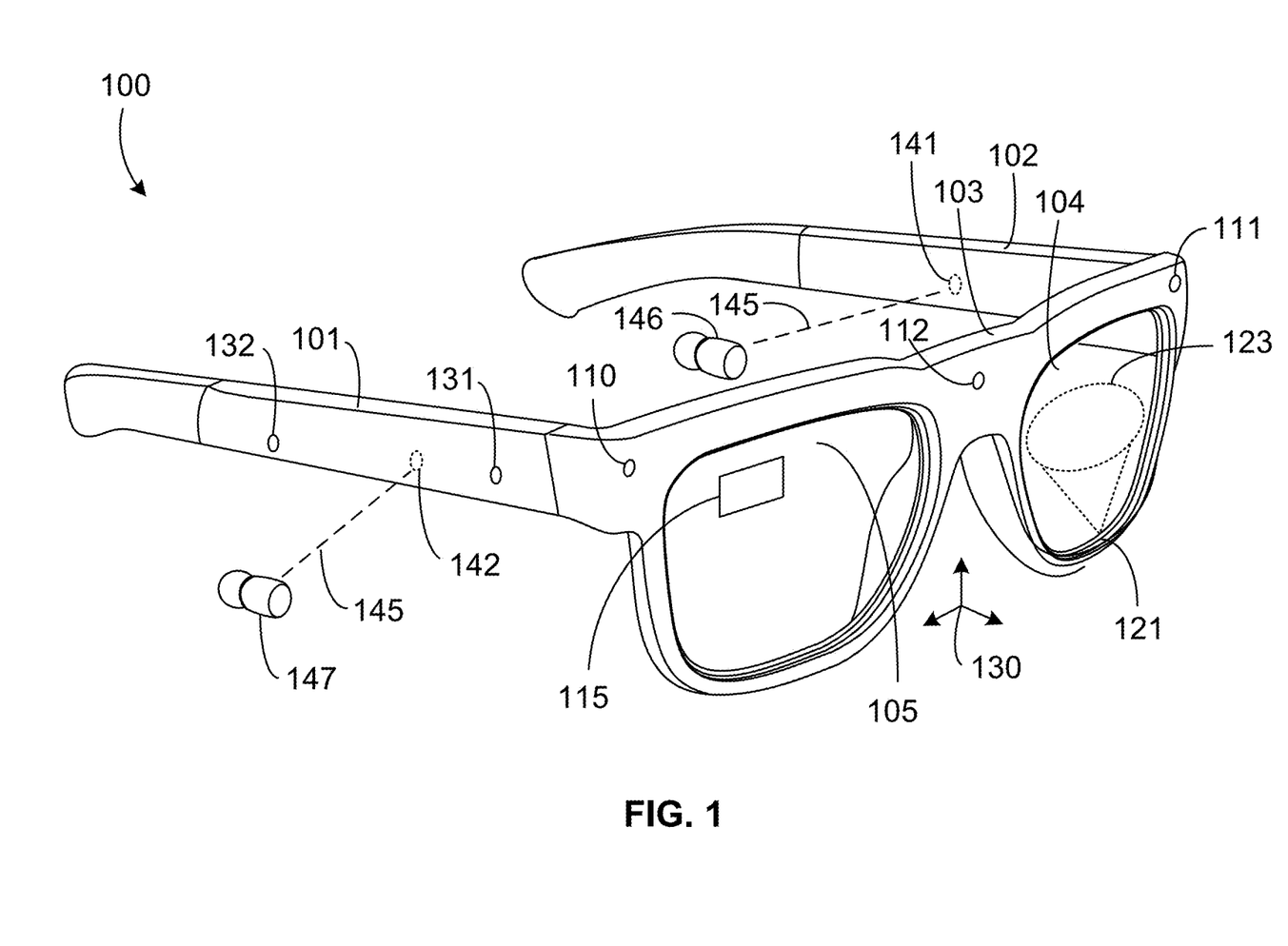
FIG. 1 is a perspective view of an extended-reality device according to a possible implementation of the present disclosure.

FIG. 1 is a perspective view of an extended-reality device according to a possible implementation of the present disclosure. As shown, the extended-reality device may be implemented as smart glasses configured for augmented reality (i.e., AR glasses).

As shown in FIG. 1, AR glasses 100 are configured to be worn on the head and face of a user. The AR glasses 100 include a right earpiece 101 and a left earpiece 102 that are supported by the ears of a user. The AR glasses 100 further include a bridge portion 103 that is supported by the nose of the user so that a left lens 104 and a right lens 105 can be positioned in front a left eye of the user and a right eye of the user respectively. The portions of the AR glasses 100 can be collectively referred to as the frame of the AR glasses. The frame of the AR glasses can contain electronics to enable function. For example, the frame may include a battery, a processor, a memory (e.g., non-transitory computer readable medium), electronics to support sensors (e.g., cameras, depth sensors, etc.), at least one position sensor (e.g., an inertial measurement unit) and interface devices (e.g., speakers, display, network adapter, etc.). The AR glasses may display and sense an environment relative to a coordinate system 130. The coordinate system 130 can be aligned with the head of a user wearing the AR glasses. For example, the eyes of the user may be along a line in a horizontal (e.g., LEFT/RIGHT, X-axis) direction of the coordinate system 130.

A user wearing the AR glasses 100 can experience information displayed in an area corresponding to the lens (or lenses) so that the user can view virtual elements within their natural field of view. Accordingly, the AR glasses 100 can further include a heads-up display (i.e., HUD) configured to display visual information at a lens (or lenses) of the AR glasses. As shown, the heads-up display may present AR data (e.g., images, graphics, text, icons, etc.) on a portion 115 of a lens (or lenses) of the AR glasses so that a user may view the AR data as the user looks through a lens of the AR glasses. In this way, the AR data can overlap with the user's view of the environment. In a possible implementation, the portion 115 can correspond to (i.e., substantially match) area(s) of the right lens 105 and/or left lens 104.

The AR glasses 100 can include an inertial measurement unit (IMU) that is configured to track motion of the head of a user wearing the AR glasses. The IMU may be disposed within the frame of the AR glasses and aligned with the coordinate system 130 of the AR glasses 100.

The AR glasses 100 can include a world-camera 110 that is directed to a first camera field-of-view that overlaps with the natural field-of-view of the eyes of the user when the glasses are worn. In other words, the world-camera 110 (i.e., world-facing camera) can capture images of a view aligned with a point-of-view (POV) of a user (i.e., an egocentric view of the user).

In a possible implementation, the AR glasses 100 can further include a depth sensor 111. The depth sensor 111 may be implemented as a second camera that is directed to a second field-of-view that overlaps with the natural field-of-view of the eyes of a user when the glasses are worn. The second camera and the world-camera 110 may be configured to capture stereoscopic images of the field of view of the user that include depth information about objects in the field of view of the user. The depth information may be generated using visual odometry and used as part of the camera measurement corresponding to the motion of the head-mounted device. In other implementations the depth sensor 111 can be implemented as another type of depth (i.e., range) sensing device, including (but not limited to) a structured light depth sensor or a lidar depth sensor. The depth sensor 111 can be configured to capture a depth image corresponding to the field-of-view of the user. The depth image includes pixels having pixel values that correspond to depths (i.e., ranges) to objects measured at positions corresponding to the pixel positions in the depth image.

In a possible implementation, the AR glasses 100 can further include an illuminator 112 to help the imaging and/or depth sensing. For example, the illuminator 112 can be implemented as an infra-red (IR) projector configured to transmit IR light (e.g., near-infra-red light) into the environment of the user to help the world-camera 110 capture images and/or the depth sensor 111 to determine a range of an object.

The AR glasses 100 can further include an eye-tracking sensor. The eye tracking sensor can include a right-eye camera and/or a left-eye-camera to capture eye-images of the left eye and/or right eye of the user wearing the glasses. As shown, an eye-camera 121 can be located in a portion of the frame so that a FOV 123 of the eye-camera 121 includes at least a portion (e.g., pupil, iris, retina, etc.) of the eye of the user when the AR glasses are worn.

Figure 3:
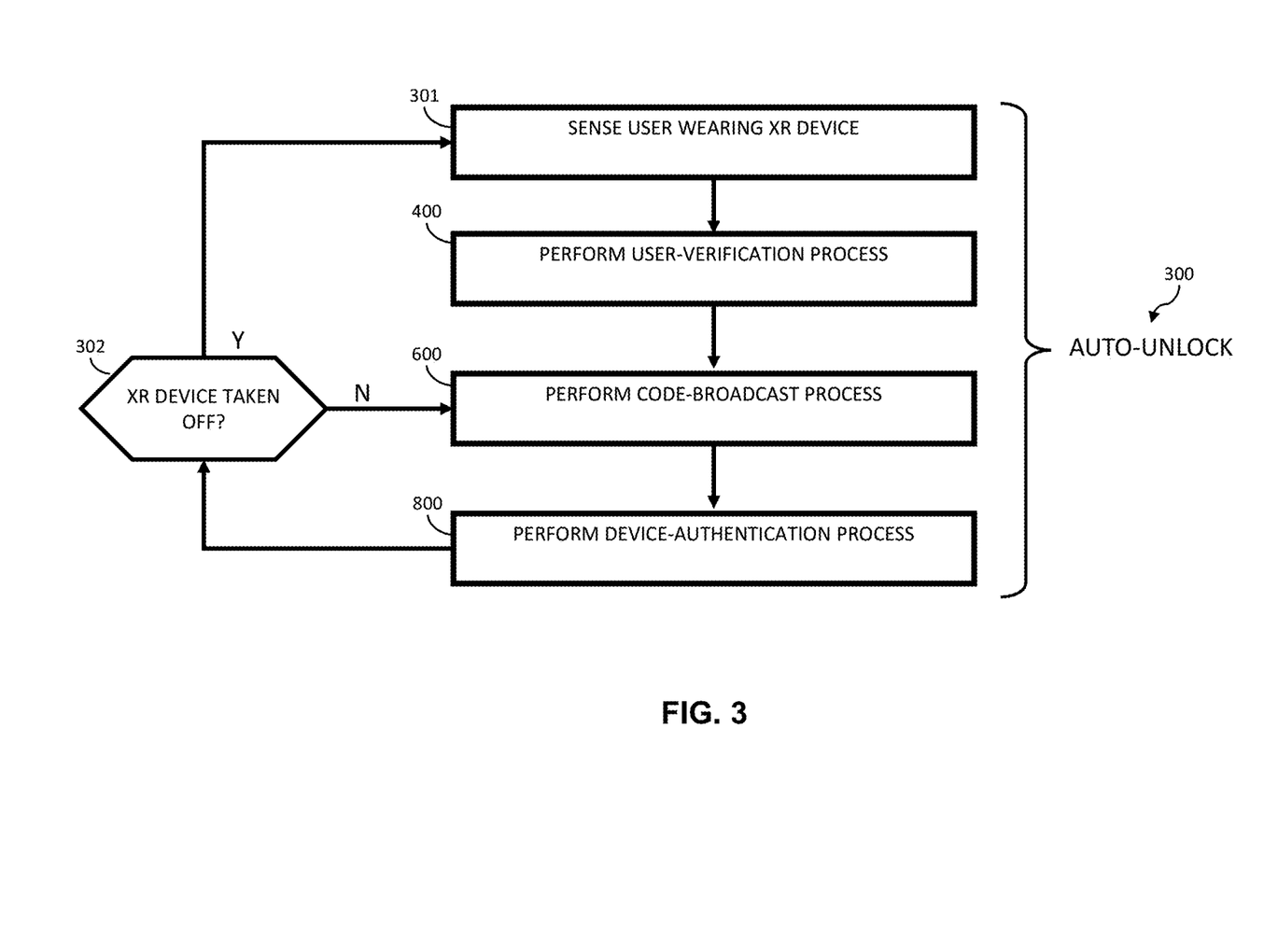
FIG. 3 is a flowchart of a method for automatically unlocking a registered device using an extended-reality device according to an implementation of the present disclosure.

The AR glasses 100 can further include one or more microphones. The one or more microphones can be spaced apart on the frames of the AR glasses. As shown in FIG. 3, the AR glasses can include a first microphone 131 and a second microphone 132. The microphones may be configured to operate together as a microphone array. The microphone array can be configured to apply sound localization to determine directions of the sounds relative to the AR glasses.

The AR glasses may further include a left speaker 141 and a right speaker 142 configured to transmit audio to the user. Additionally, or alternatively, transmitting audio to a user may include transmitting the audio over a wireless communication link 145 to a listening device (e.g., hearing aid, earbud, etc.). For example, the AR glasses may transmit audio to a left wireless earbud 146 and to a right earbud 147.

A user of an extended reality device may intend to interact with a device that is disabled for use (i.e., locked). In some cases, the position of the locked device may indicate this intent. For example, a mobile phone can be positioned in a field of view of the user so that a visual display (e.g., screen) of the mobile phone faces the user when the user intends to interact with the mobile phone.

Figure 2A:
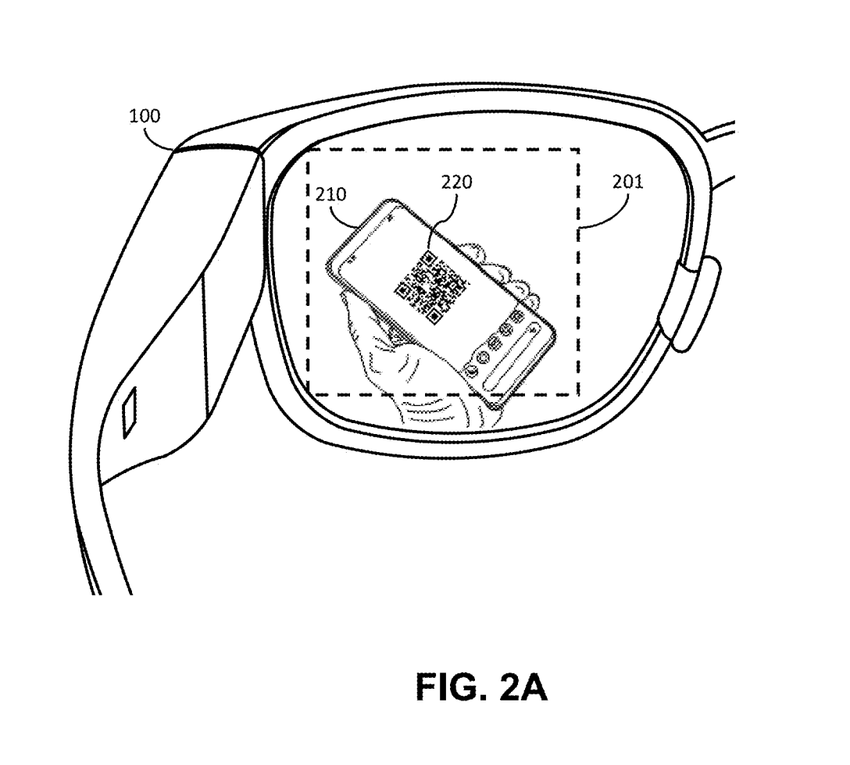
FIG. 2A illustrates a possible world-image captured by a world-camera of an extended reality device according to a possible implementation of the present disclosure.

FIG. 2A illustrates a possible world-image captured by a world-camera of an extended reality device according to a possible implementation of the present disclosure. As shown, a device 210 (i.e., mobile phone) is positioned within a user's point of view through a lens of AR glasses 100. The world-camera 110 of the AR glasses may be aligned with the point-of-view of the user so that the world-image 201 captured by the world-camera 110 substantially matches the egocentric view through the lens of the AR glasses. In this alignment, the world-image 201 from the world-camera may be used to recognize the device 210. What is more, the device 210 may be triggered (e.g., based on its position relative to the user) to display characters, patterns, shapes, and/or colors (i.e., code 220) to help identify the device 210.

Figure 2B:
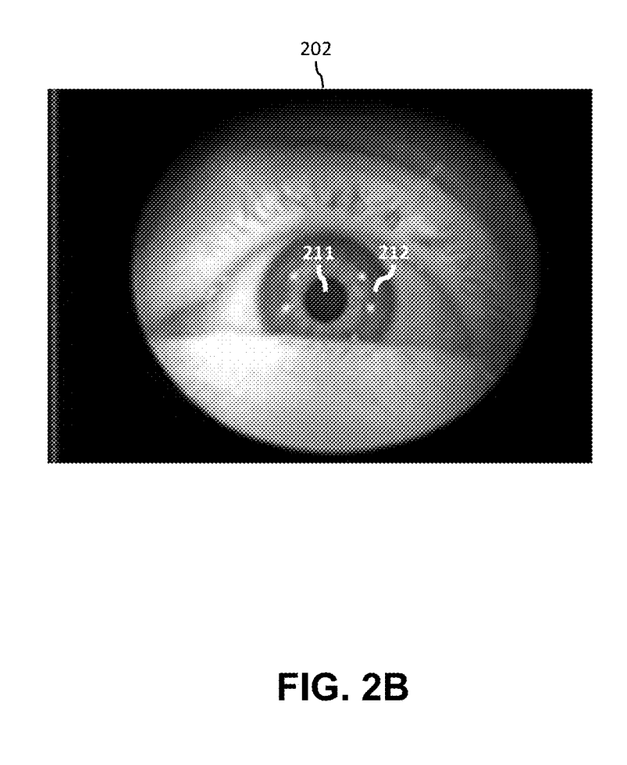
FIG. 2B illustrates a possible eye-image captured by an eye-camera of an extended reality device according to a possible implementation of the present disclosure.

FIG. 2B illustrates a possible eye-image captured by an eye-camera of an extended reality device according to a possible implementation of the present disclosure. As shown, the eye-image 202 can include portions of the eye, which can be used to track a user's gaze. For example, a pupil 211 of the eye may be recognized in the eye-image and the location of the pupil within the eye-image may help to determine a direction that the user is looking. For example, a gaze direction may help to determine that a device in the direction of the gaze is of interest to a user.

The eye-image 202 can further include portions of the eye, which can be used to identify the user. An iris portion of the eye may have unique features (colors, patterns, and/or shapes) for each user. Accordingly, an iris 212 may be recognized in the eye-image 202 and used to identify a user in much the same way that a fingerprint can identify a user. This recognition may include comparing features obtained from the eye-image 202 to a database of known features/users. Accordingly, eye-images may be captured periodically in order to verify that the user is wearing the AR glasses 100, that the AR glasses have not been removed, and that a different user is not wearing the AR glasses.

The eye-image 202 and world-image 201 capture and analysis may occur within a period so that some conclusions may be reached automatically by computer programs (i.e., applications) running (at least partially) on the extended reality device. For example, the eye-image 202 may be processed to verify an identity of a user based on an iris in the eye-image, while the world-image 201 may be processed to detect a device that is likely to be used by the user based on a relative location of the device to the user, as determined from the world-image. Additionally, the world-image 201 may be processed to automatically recognize the device as the user's based on a visual code displayed by the device, as determined from the world-image. Once these conclusions are reached (and while they continue) the device may be automatically unlocked for use.

FIG. 3 is a flowchart of a method for automatically unlocking a registered device using an extended-reality device according to an implementation of the present disclosure. The method 300 includes sensing 301 a user wearing an extended-reality device. The sensing may be performed initially when a user begins to wear the extended-reality device (e.g., has put-on the AR glasses). Additionally, the sensing may be performed continuously or periodically to verify that the user is still wearing the extended reality device after the user puts on the device. The sensing 301 may include detecting the user based on a touch of the user (e.g., from a touch sensor, button, etc.). The sensing 301 may further include detecting a motion of the user (e.g., from an IMU, world-camera, etc.). The sensing 301 may further include capturing an image of the user (e.g., from an eye-camera). The sensing 301 may further include capturing a sound/voice of the user (e.g., from a microphone). The captured data may be processed individually or in combination (e.g., neural network) by the extended-reality device to determine that the user is wearing the extended-reality device. In a possible implementation, the capture data may be processed individually or in combination by the extended-reality device to determine that the user is no longer wearing the extended-reality device. In other words, the method 300 includes determining if (i.e., Y/N) the extended reality device has been taken-off 302.

Figure 4:
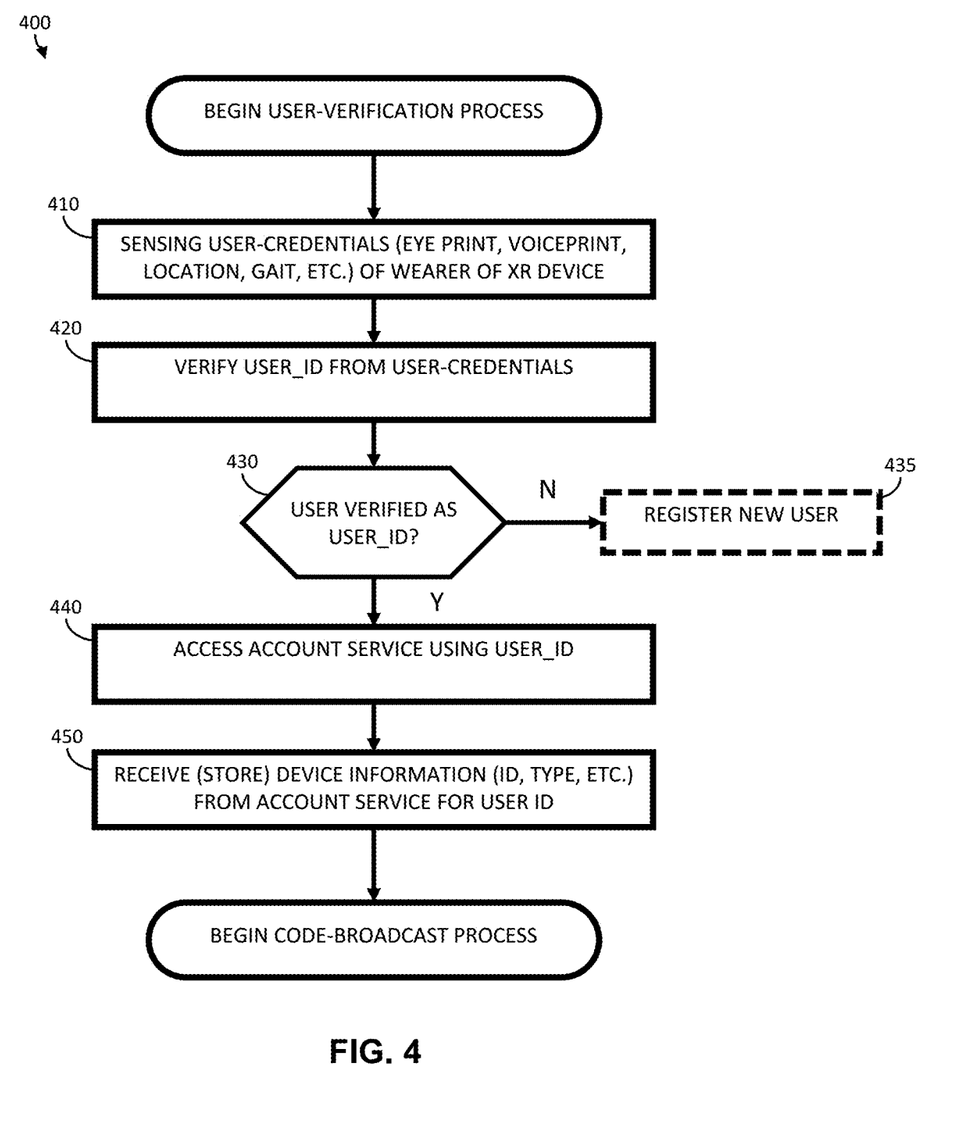
FIG. 4 is a flowchart for a possible user-verification process for the method of FIG. 3.

The method 300 further includes performing a user-verification process. In other words, sensing that the device is being worn by a user may or may not, provide information sufficient to determine which user (of a list of registered users) is wearing the device. Accordingly, the method 300 further includes performing a user-verification process 400.

FIG. 4 is a flowchart illustrating details of a possible user-verification process. The user-verification process 400 includes sensing 410 user-credentials of a person wearing the XR device. The user-credentials may be one or more biometrics that are unique or otherwise indicative of a user, when observed either alone or in combination. In a first possible implementation, user-credentials may include a characteristic(s) of a user's eye, such as a size, shape, pattern, and/or color of an iris of the eye of the user (i.e., eye print), which can be sensed by an eye-camera of the XR device. In a second possible implementation, user-credentials may include a characteristic(s) of a user's voice (i.e., voice print), which can be sensed by a microphone of the XR device. In a third possible implementation, user-credentials may include a location of the user (e.g., user's home), which can be sensed by a global positioning system (GPS) of the XR device. In a fourth possible implementation, user-credentials may include a characteristic movement (e.g., gait) of the user, which can be sensed by an IMU of the XR device.

The user-verification process 400 further includes verifying 420 a user's identity (e.g., user_ID) from the sensed user-credentials. In a possible implementation, the sensed user-credentials may be compared to a database (e.g., on the XR device) with entries of stored user-credentials linked with (i.e., indexed by) user identities. Verifying 420 the user may include determining 430 (i.e., Y/N) that the sensed user-credentials match the stored user-credentials.

The matching may include calculating a correlation score that satisfies a criterion. For example, a sensed user-credential that matches a stored user-credential perfectly may generate a correlation score of 100%. In this example, verifying the user as a user identity (user_ID) in a database of users may include determining that the correlation score for the user identity is greater than a threshold, and determining that the correlation score for all other user identities in the database of users are less than the threshold. In a possible implementation, if all correlation scores are less than the threshold, it may be determined that the user-credentials are not in the database of users stored on the XR device. This condition may prompt a registration 435 of a new user to on the XR device, which can include storing the sensed user-credentials for the new user in the database on the XR device.

In the user-verification process 400, after determining 430 that the sensed user-credentials match the stored user-credentials, the XR device may be triggered to access 440 an account service using the verified user identity, which can include a username and a password. The account service may be a network service (i.e., cloud service) that includes information about the user, including (but not limited to) devices of the user, activity of the user, and personal information about the user. Accessing 440 the account service may include transmitting a request from the XR device for device information associated with the user_ID.

In the user-verification process 400, after accessing 440 the account service, the XR device may receive 450 device information related to devices registered to the user from the account service. In other words, the XR device may transmit a user_ID to the account service in order to receive device information for devices registered to the user. The device information may include a device type (e.g., laptop, mobile phone, computer, etc.) for each device registered to the user. The device information may include a device identification (device_ID) for each device registered the user. This received device information may be stored on the XR device.

Figure 5:
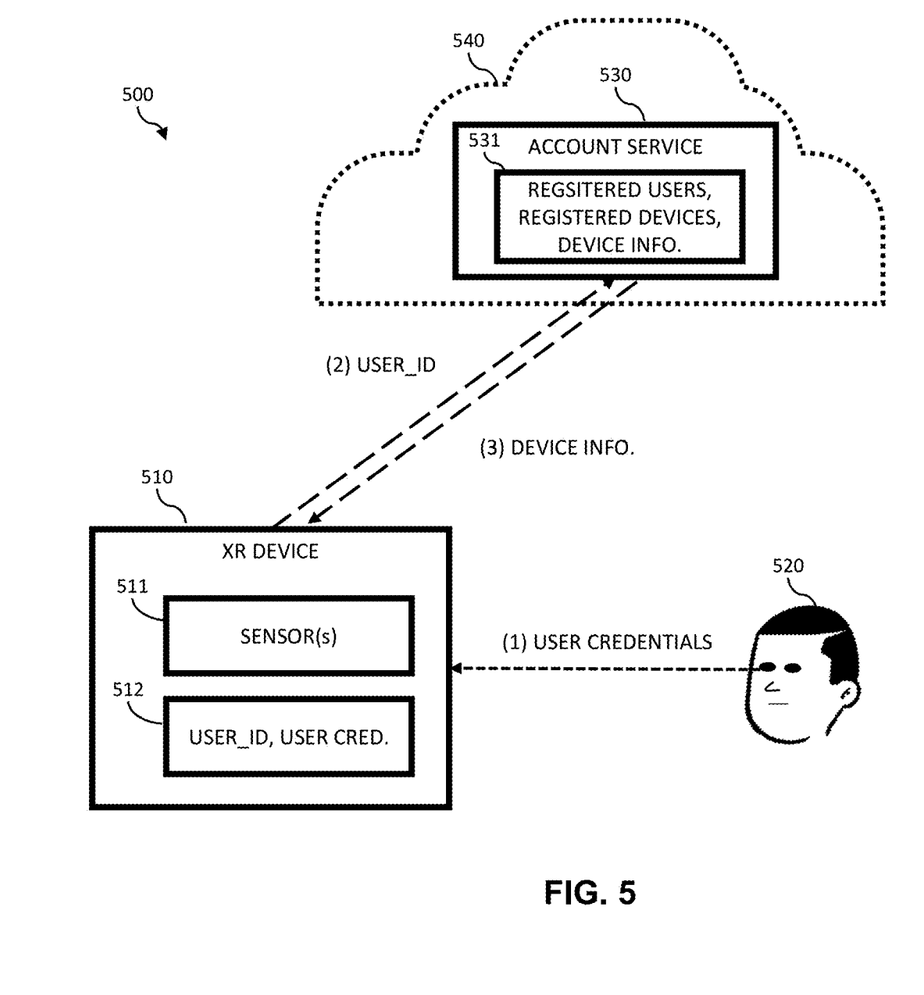
FIG. 5 is a block diagram illustrating a system for verifying a user of an extended-reality device according to a possible implementation of the present disclosure.

FIG. 5 is a block diagram illustrating a system for verifying a user of an extended-reality device according to a possible implementation of the present disclosure. The system 500 includes a XR device 510 worn by a user 520. The system further includes an account service 530 that is communicatively coupled to the XR device. For example, the account service 530 may include computers (e.g., servers) and memories (e.g., databases) that are part of a network 540. For example, the account service may be a cloud service that is part of the internet, and the XR device may be configured to communicate with the cloud service over the internet. The account service may maintain a database of registered users and device information for each registered user.

As shown, one or more sensors 511 of the XR device 510 may be configured to capture (and store) one or more user credentials 512 of the user 520. For example, an eye-camera of the XR device may capture an image including an iris of the eye of the user. The XR device may be configured to use the one or more user credentials to determine a user-identification (i.e., user_ID).

As shown, the XR device 510 may transmit a request to the account service 530 for device information for a registered user corresponding to the user-identification (user_ID). The account service may have memory for storing a database of registered users and their corresponding registered devices 531. Accordingly, the XR device may obtain (i.e., receive) device information for the registered user from the account service 530 in a response to the request.

Returning to FIG. 1, after performing the user-verification process 400 the user identity and the user's devices may be available (e.g., in a memory) on the XR device. The method 300 further includes performing a code-broadcast process 600.

Figure 6:
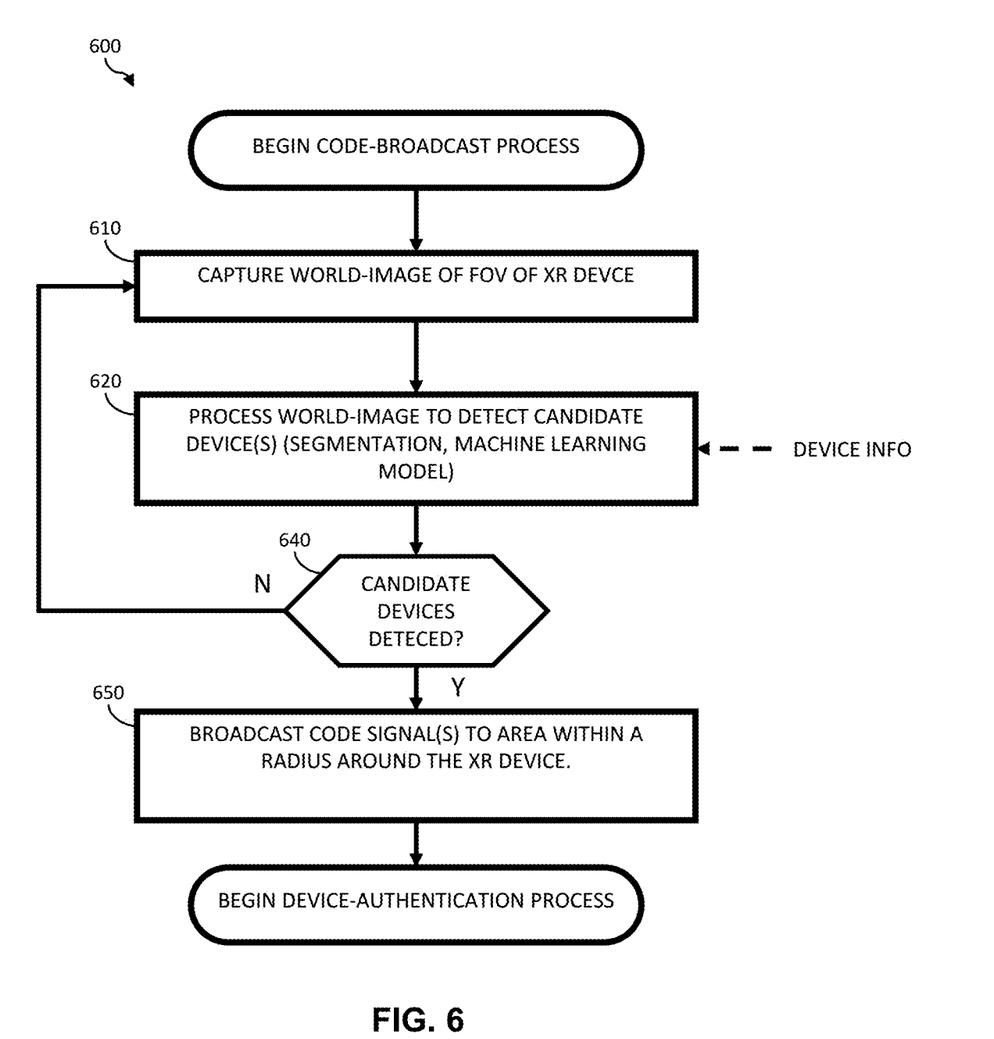
FIG. 6 is a flowchart for a possible code-broadcast process for the method of FIG. 3.

FIG. 6 is a flowchart illustrating details of a possible code-broadcast process. The code-broadcast process 600 includes capturing 610 one or more world-images of a field-of-view (FOV) of an XR device. As mentioned previously, the field-of-view (FOV) of the world image may be aligned with a point-of-view (POV) of a user. Devices in the FOV may be of interest to a user because using the devices may require the user to view the devices. Accordingly, any or all electronic devices detected in the FOV of the world-image may be recognized as candidates for use by the user and therefore as candidates for unlocking (i.e., candidate devices).

The code-broadcast process further includes processing 620 the world-image to detect one or more electronic devices in the world-image and to tag, highlight, or otherwise distinguish these electronic devices as candidate devices. The processing may include an image recognition algorithm (e.g., running on the XR device) configured to recognize an electronic device in the world-image by its visual characteristics. For example, the visual characteristics may include one or more of a size, a shape, a color, a texture, or a component (e.g., screen, button, etc.) that can be processed alone or in combination to recognize a candidate device. In a possible implementation, the recognition may include image segmentation to isolate an area in the world-image that contains a device and a machine learning model (e.g., neural network) configured to recognize a candidate device in the segmented image.

In a possible implementation, the processing 620 of the world-image to detect the candidate device can be informed by the device information obtained in the user-verification process 400. For example, device information for a user specifying that, in addition to the XR device, only a mobile phone is registered to the user may adjust an image recognition algorithm to only recognize mobile phones in the world-image as candidate devices.

The code-broadcast process 600 can determine if (i.e., Y/N) a candidate device is detected 640. The detection of the candidate device(s) in world images may repeat (e.g., periodically, triggered by movement, etc.) until at least one candidate device is detected.

When a candidate device is detected, the code-broadcast process 600 may broadcast 650 a code signal (or code signals) to an area around the XR device. The code signal may trigger candidate devices, which are registered to the user, to visually display a code from the code signal. In a possible implementation, multiple code signals are broadcast (e.g., in series) with each code signal addressed to one of the registered devices. In another possible implementation, one code signal addressed to all of the user's registered devices is broadcast. In another possible implementation, the code signal includes a device identifier (device_ID) for the registered device to use in a response to the code signal. In another possible implementation, the code signal includes a code that is supplemented by a device identifier (device_ID) provided by the registered device in a response to the code signal. In either case, registered devices may be triggered to visually display codes unique to each registered device.

Figure 7:
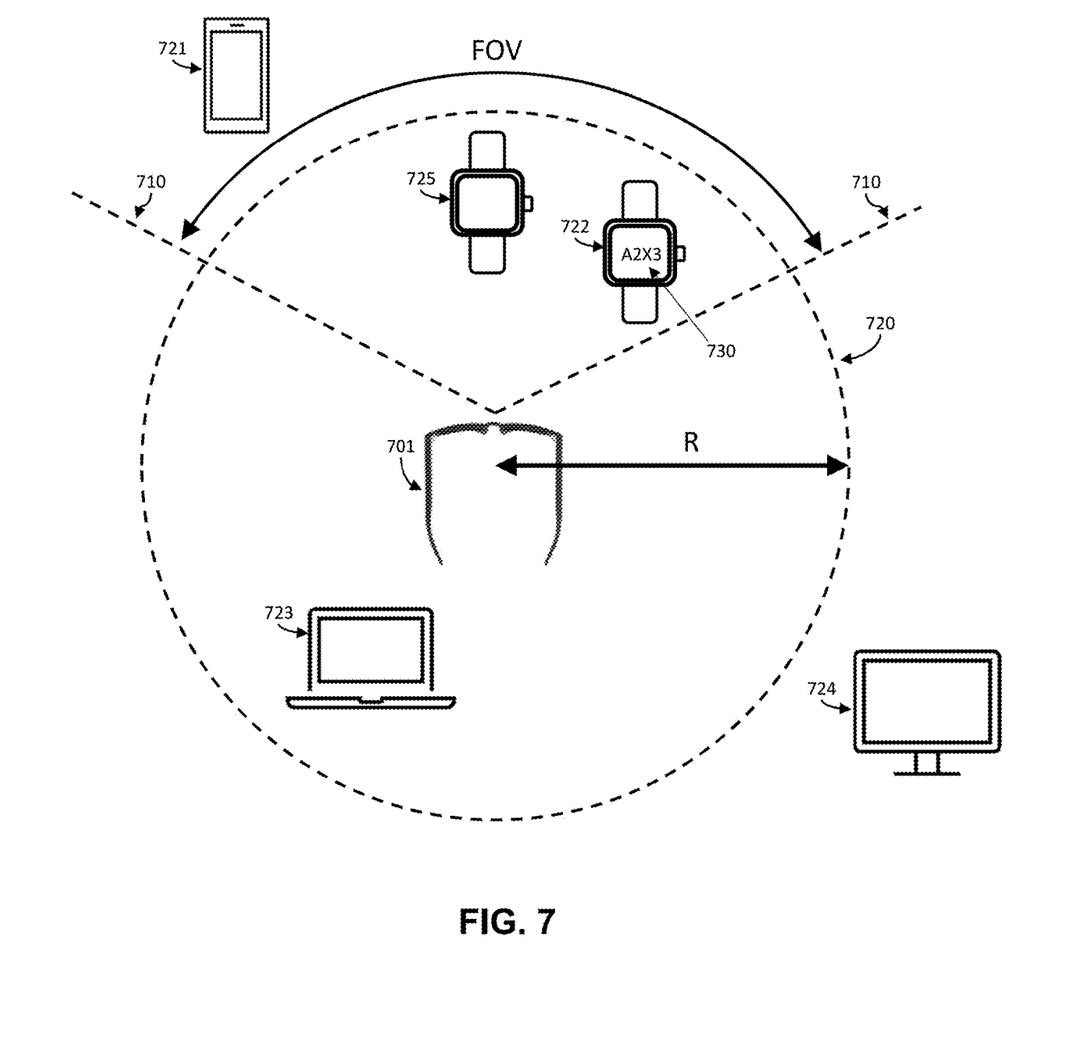
FIG. 7 is a block diagram illustrating devices in an area around an extended reality device according to a possible implementation of the present disclosure.

FIG. 7 is a block diagram illustrating devices in an area around an extended reality device according to a possible implementation of the present disclosure. As shown, an XR device 701 may define an area 720 around the extended-reality device 701. In particular, the area 720 around the extended-reality device 701 may be defined by a radius (R) from the XR device. The radius (R) may correspond to a maximum range at which the code signal broadcast by the XR device 701 can be detected (i.e., maximum detectable range) by other devices. In other words, the broadcasted code signal may be substantially limited to the area 720 around the extended-reality device (i.e., within range (R)).

Accordingly, only candidate devices, which are registered to the user and which are in range of the XR device may be triggered to visually display the code from the code signal.

As shown, an XR device 701 may further define a field-of-view 710 (FOV). In particular, the field-of-view 710 may be defined by a field-of-view of the world-camera of the XR device 701. In other words, the field-of-view 710 may define a portion of the area around the XR device that can be captured in a world-image by the world-camera, which as mentioned previously, can be aligned with the viewing area of a user.

For the example illustrated in FIG. 7, a world-image of the field-of-view may be processed to detect a mobile phone 721 and a first smartwatch 722 and a second smartwatch 725. The detection of these candidate devices triggers the XR device 701 to broadcast the code signal to the area 720 around the XR device. The range of this broadcast may be considered low-range because the mobile phone 721, while in view of the XR device, does not receive the code signal. For example, the broadcast may use a low-range communication protocol, including (but not limited to) near-field communication, Bluetooth, or ultra-wideband (UWB).

As shown in FIG. 7, a laptop computer 723, in the area 720, would not trigger the broadcast of the code signal but receives the code, nevertheless. If the laptop computer is registered to the user, the received code signal will trigger the laptop computer to display (e.g., on its display) a visual representation of a code from the code signal. However, because the laptop computer is outside the field of view 710 this visual display is not detectable by the world-camera of the XR device.

In a possible implementation, only locked devices will be triggered to visually display the code. Thus, if the laptop computer 723, shown in FIG. 7, is in use (i.e., unlocked), then no code will be displayed in response to the code signal. This added criterion for display may prevent the visual display of the code from interrupting a person that is actively using a device registered to the user.

As shown in FIG. 7, a smart-hub 724 will not trigger a broadcast, as it is outside the field-of-view 710. Further, the smart-hub 724 cannot receive the broadcast code signal because it is outside the area 720 around the XR device 701. For the example shown in FIG. 7, only the first smartwatch 722 and the second smartwatch 725 can both trigger the broadcast of the code signal and can receive the code signal after it is broadcast. This implies that of the devices shown in FIG. 7, only the first smartwatch 722 and the second smartwatch 725 can begin a device-authentication process for unlocking.

Figure 8:
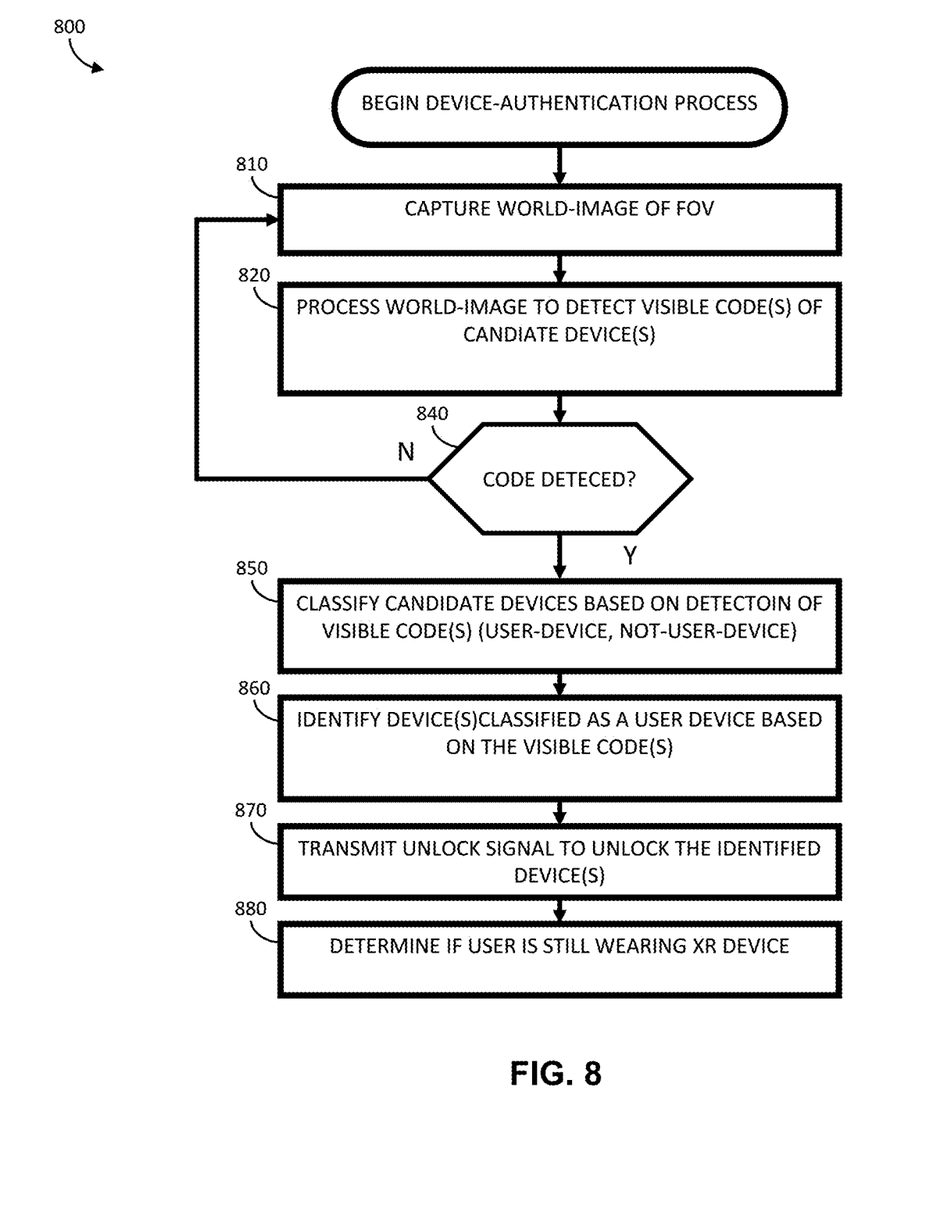
FIG. 8 is a flowchart for a possible device-authentication process for the method of FIG. 3.

FIG. 8 is a flowchart for a possible device-authentication process for the method of FIG. 3. The device-authentication process 800 includes capturing 810 (using the XR device) a world-image of the field-of-view 710 and processing 820 the world-image to detect one or more visible codes (i.e., visual codes)) displayed (e.g., on screen(s)) of one or more candidate devices. If no code is detected 840, this detection process may repeat until a code is detected or until the end of a time-out period. If a code is detected 840, then the device-authentication process 800 includes classifying 850 any candidate device that displayed a code in response to the code signal as a device registered to a user (i.e., registered devices, user devices, etc.). Conversely, any candidate device that did not display a code in response to the code signal is classified as a device not registered to the user (i.e., unregistered devices). Devices that are not registered to the user may be unable to receive the code signal or may receive the code signal and ignore it. For example, the code signal may be addressed only to a user device or devices.

The device-authentication process 800 further includes identifying 860 each registered device based on the code it displays. For example, if a user has two devices registered to his/her account then the code can identify which of the two devices the candidate device is. A code can include any combination of characters, numbers, patterns, shapes, and/or colors to convey an identity. For example, the code may be a numerical sequence that includes a device identifier (i.e., identification) portion and an authorization code portion. In a possible implementation, the numerical sequence is encoded as an indicium, such as a barcode or QR code.

The classification and identification may occur as a combined detection operation. The detection operation can include capturing a world-image after the code signal is broadcast, where the world image includes a portion (i.e., FOV) of the area around the extended-reality device. Then, processing the world-image to verify the identity of a registered device based on the numbers, characters, patterns, shapes, and/or colors displayed by the device in response to the code signal. The device-authentication process 800 further includes configuring the XR device to transmit 870 an unlock signal to unlock each identified device. Further the device-authentication process 800 further include determining 880 if the user is still wearing the XR device so that the unlocking process can continue while the user wears the device and can stop whenever the user stops wearing the device.

Returning to FIG. 7, the first smartwatch 722 visually displays a code 730 in response while the second smartwatch 725 does not. A world-image captured by the XR device 701 may be processed to determine that the first smartwatch 722 is the user's based on this display. Further, the code 730 displayed may identify which registered device is the first smartwatch 722. For example, a first portion of the code (i.e., A2X) may be an authorization transmitted in the code signal. The display of the authorization code can indicate that the code was received. A second portion of the code (i.e., 3) may indicate that this is the $3^{rd}$ registered device of the user. By displaying this information, the XR device can determine which device is authorized for the user to use and then unlock the particular device by transmitting an unlock signal for the authorized device.

The unlock signal may configure the authorized device for operation (i.e., unlock). In a possible implementation the XR device may transmit an unlock signal directly from the extended-reality device to each identified device. In another possible implementation, the XR device may transmit an unlock signal from the extended-reality device to an account service, which is in communication with the registered device, and the unlock signal may trigger the account service to transmit a signal to the registered device to unlock the registered device for use. In other words, unlocking the registered device may be accomplished by the extended reality device alone or may be mediated by the account service.

Figure 9:
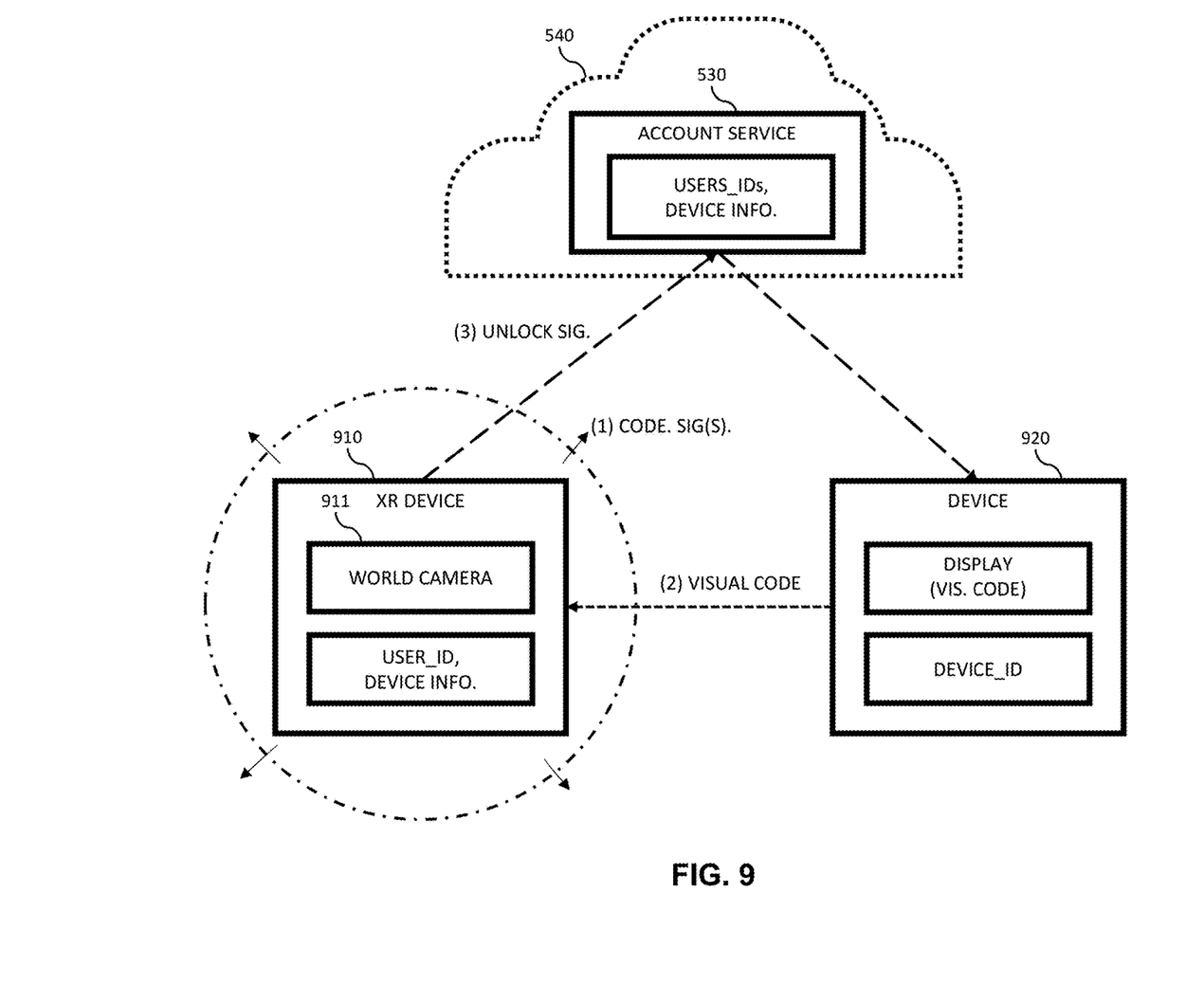
FIG. 9 is a block diagram illustrating a system for unlocking a device of a user of an extended-reality device according to a possible implementation of the present disclosure.

FIG. 9 is a block diagram illustrating a system for unlocking a device of a user of an extended-reality device according to a possible implementation of the present disclosure. The system includes an XR device 910 configured to capture an image (or images) of a device 920 using a world camera. At this stage in the auto unlocking procedure, the XR device 910 may have, stored in a memory, the user's identification and the user's device information, including device identifiers. The XR device is further configured to communicate (e.g., digitally) with an account service 530, which as mentioned, may include computers (e.g., servers) and memories (e.g., databases) that are part of a network 540. For example, the account service 530 may be a cloud service that is part of the internet, and the XR device may be configured to communicate with the cloud service over the internet. The account service may maintain a database of registered users and device information for each registered user.

Upon detecting the device, the XR device 910 may broadcast a code signal in an approximate isotropic pattern around the XR device. The code signal may then trigger the device 920 to display a visual code corresponding to the code signal. For example, when the code signal includes an authorization code, the visual code may also include authorization code. As mentioned, the visual code may be displayed on a display of the device, but it may also be displayed through other visual means, such as a flashing light. The XR device may sense this visual code with the world camera 911 to determine that the device is authorized for use and which device of the user's devices should be unlocked. The determination may be facilitated through the visual code. For example, the visual code may include a device_ID identifying the device. Upon identifying the device for unlocking, the XR device 910 may transmit an unlock signal to the account service 530 identifying a device for unlocking. The account service 530 may be in communication with the device 920 (e.g., via the internet) and can unlock the device 920 remotely by transmitting a signal to the device.

Figure 10:
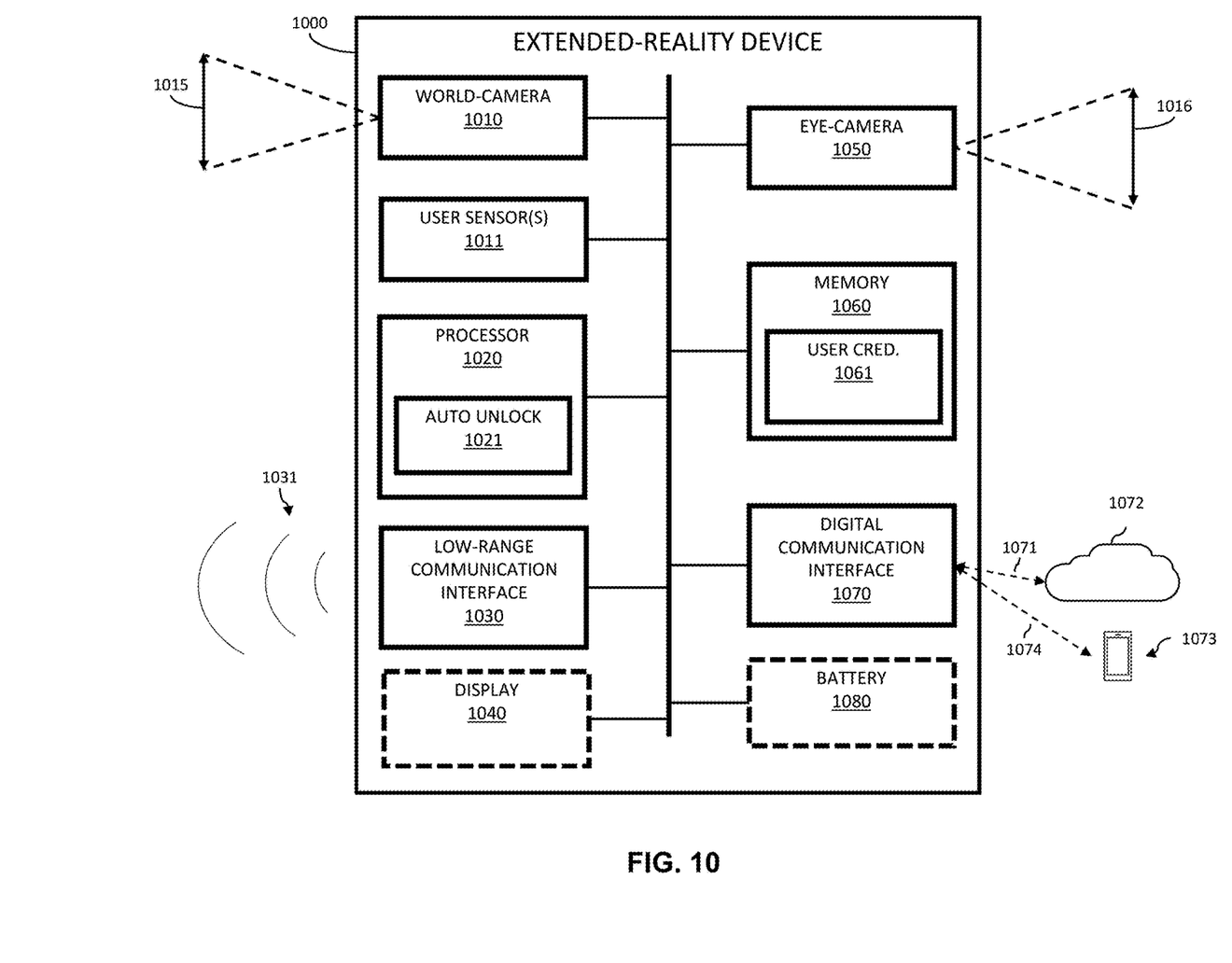
FIG. 10 is a system block diagram of an extended-reality device according to a possible implementation of the present disclosure.

FIG. 10 is a system block diagram of an extended-reality device according to a possible implementation of the present disclosure. The extended-reality device 1000 includes a world-camera 1010 configured to capture images of a field-of-view 1015 aligned with a point-of-view of a user wearing the extended-reality device 1000. The extended-reality device 1000 further includes at least one eye-camera 1050 configured to capture images of a field-of-view 1016 including at least a portion of an eye of the user. The extended-reality device 1000 further includes one or more user sensors 1011 configured to sense a user wearing the extended-reality device. The user sensors 1011 may include an inertial measurement unit (IMU) configured to detect a movement of an extended-reality device and/or a touch sensor configured to detect the skin of a user.

The extended-reality device 1000 further includes a low-range communication interface 1030 configured to broadcast a code signal 1031 into an area around the extended-reality device 1000. The extended reality device further includes a digital communication interface 1070 configured to digitally communicate with another device 1073 or networks 1072. The digital communication with a network 1072 may be over a network communication link 1071 (e.g., WLAN, 5G, etc.), while the digital communication with a device 1073 may be over a short-range communication link 1074 (e.g., BLUETOOTH, UWB, NFC, etc.). The extended reality device can include a display 1040, such as a heads-up display. The network communication link 1071 may allow the sharing of the processing necessary to carry out the operation described herein with other devices in communication with the extended-reality device.

The extended-reality device 1000 can further include a battery 1080 to energize the circuitry and enable operation. The life of the battery may be enhanced when the eye-camera and/or the world camera is operated in lower-power mode (e.g., lower resolution, grayscale, lower frame rate, etc.)

The extended-reality device 1000 may further include a memory 1060. The memory may be a non-transitory-computer-readable medium configured to store user credentials 1061 (e.g., iris characteristics) of users registered to use the extended reality device.

The extended-reality device 1000 further includes a processor 1020 that can be configured by software instructions to perform operations to execute one or more computer programs to carry out the auto-unlock procedure 1021 described herein (see FIG. 3). These computer programs (also known as modules, programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In the following, some examples of the disclosure are described.

Example 1. A method implemented on an extended-reality device, the method comprising: verifying that a user, wearing the extended-reality device, is a registered user; detecting a candidate device in an area around the extended-reality device; broadcasting, in response to detecting the candidate device, a code signal, the code signal readable only by a registered device of the registered user and including a code for visual display on the registered device; detecting, after broadcasting the code signal, the visual display of the code on the candidate device to verify that the candidate device is the registered device; and transmitting, after verifying that the candidate device is the registered device, an unlock signal to enable the registered device for use.

Example 2. The method according to example 1, wherein verifying that the user, wearing the extended-reality device, is the registered user includes: capturing an eye-image of the user using an eye-camera of the extended-reality device.

Example 3. The method according to example 2, wherein verifying that the user, wearing the extended-reality device, is the registered user further includes: detect an iris in the eye-image; matching the iris to the registered user; and obtaining a user-identification for the registered user.

Example 4. The method according to example 3, wherein verifying that the user, wearing the extended-reality device, is the registered user further includes: transmitting a request to an account service for device information for the registered user corresponding to the user-identification; and receiving the device information for the registered user in a response to the request.

Example 5. The method according to example 1, wherein detecting the candidate device in the area around the extended-reality device includes: capturing a world-image of a field-of-view portion of the area around the extended-reality device; and recognizing an electronic device in the world-image.

Example 6. The method according to example 1, wherein the broadcasting the code signal is substantially limited to the area around the extended-reality device.

Example 7. The method according to example 1, wherein the code signal includes a device identifier for the registered device.

Example 8. The method according to example 7, wherein the code for visual display on the registered device includes numbers, characters, patterns, shapes, and/or colors unique to the device identifier.

Example 9. The method according to example 8, wherein detecting the visual display of the code on the candidate device includes: capturing a world-image of a portion of the area around the extended-reality device using a world-camera of the extended-reality device; and processing the world-image to verify the identify the registered device based on the numbers, characters, patterns, shapes, and/or colors of the code.

Example 10. The method according to example 1, wherein transmitting the unlock signal to enable the registered device for use includes: transmitting an unlock signal directly from the extended-reality device to the registered device, the unlock signal configured to unlock the registered device.

Example 11. The method according to example 1, wherein transmitting the unlock signal to enable the registered device for use includes: transmitting an unlock signal from the extended-reality device to an account service, which is in communication with the registered device, the unlock signal configuring the account service to unlock the registered device.

Example 12. The method according to example 1, further including: periodically sensing that the user is wearing the extended-reality device; and repeating detecting the candidate device in the area around the extended-reality device, broadcasting the code signal to the candidate device, detecting the visual display of the code on the candidate device to verify that the candidate device is the registered device, and transmitting an unlock signal to enable the registered device, while the user is wearing the extended-reality device.

Example 13. An extended-reality device comprising: an eye-camera directed to an eye of a user; a world-camera configured directed to a field-of-view portion of an area around the extended-reality device; a low-range communication interface configured to transmit signals into the area around the extended-reality device; and a processor configured by software instructions to: sense that the user is wearing the extended-reality device; verify that the user, wearing the extended-reality device, is a registered user based on an eye-image from the eye-camera; detect a candidate device in the area around the extended-reality device based on a first world-image from the world-camera; configure the low-range communication interface to broadcast a code signal, the code signal readable only by a registered device of the registered user and including a code for visual display on the registered device; and detect, after broadcasting the code signal, the visual display of the code on the candidate device to verify that the candidate device is the registered device based on a second image from the world-camera.

Example 14. The extended-reality device according to example 13, wherein the processor is further configured to: configure, after verifying that the candidate device is the registered device, the low-range communication interface to transmit an unlock signal directly from the extended-reality device to the registered device, the unlock signal configured to unlock the registered device.

Example 15. The extended-reality device according to example 13, further includes a network communication interface and the processor is further configured to: transmit an unlock signal from the extended-reality device to an account service, which is in communication with the registered device; the unlock signal configured the account service to unlock the registered device.

Example 16. The extended-reality device according to example 13, wherein to sense that the user is wearing the extended-reality device, the processor is further configured to: receive the eye-image from the eye-camera; and detect an iris in the eye-image; match the iris to the user to determine that the user is wearing the extended-reality device.

Example 17. The extended-reality device according to example 13, wherein the extended-reality device is augmented-reality devices.

Example 18. A method for automatically unlocking a registered device using an extended-reality device, the method comprising: detecting a candidate device in an area around the extended-reality device using a world-camera of the extended-reality device; broadcasting, in response to detecting the candidate device, a code signal using a low-range communication interface of the extended-reality device; detecting, after broadcasting the code signal, a visual display of a code on the candidate device to verify that the candidate device is the registered device; and transmitting, after verifying that the candidate device is the registered device, an unlock signal to enable the registered device for use.

Example 19. The method according to example 18, wherein the broadcasting the code signal is substantially limited to the area around the extended-reality device.

Example 20. The method according to example 18, wherein detecting the visual display of the code on the candidate device includes: capturing a world-image of a portion of the area around the extended-reality device using a world-camera of the extended-reality device; and processing the world-image to recognize the code that is visual displayed on the candidate device.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method implemented on an extended-reality device, the method comprising:
    verifying that a user, wearing the extended-reality device, is a registered user;
    detecting a candidate device in an area around the extended-reality device;
    broadcasting, in response to detecting the candidate device, a code signal, the code signal readable only by a registered device of the registered user and including a code for visual display on the registered device;
    detecting, after broadcasting the code signal, the visual display of the code on the candidate device to verify that the candidate device is the registered device, the detecting including:
    capturing a world-image of a field-of-view portion of the area around the extended-reality device; and
    recognizing the candidate device in the world-image; and
    transmitting, after verifying that the candidate device is the registered device, an unlock signal to enable the registered device for use.

2. The method according to claim 1, wherein verifying that the user, wearing the extended-reality device, is the registered user includes:
    capturing an eye-image of the user using an eye-camera of the extended-reality device.

3. The method according to claim 2, wherein verifying that the user, wearing the extended-reality device, is the registered user further includes:
    detecting an iris in the eye-image;
    matching the iris to the registered user; and
    obtaining a user-identification for the registered user.

4. The method according to claim 3, wherein verifying that the user, wearing the extended-reality device, is the registered user further includes:
    transmitting a request to an account service for device information for the registered user corresponding to the user-identification; and
    receiving the device information for the registered user in a response to the request.

5. The method according to claim 1, wherein the broadcasting the code signal is substantially limited to the area around the extended-reality device.

6. The method according to claim 1, wherein the code signal includes a device identifier for the registered device.

7. The method according to claim 6, wherein the code for visual display on the registered device includes numbers, characters, patterns, shapes, and/or colors unique to the device identifier.

8. The method according to claim 7, wherein detecting the visual display of the code on the candidate device includes:
    capturing the world-image of a portion of the area around the extended-reality device using a world-camera of the extended-reality device; and
    processing the world-image to verify an identity of the registered device based on the numbers, the characters, the patterns, the shapes, and/or the colors of the code.

9. The method according to claim 1, wherein transmitting the unlock signal to enable the registered device for use includes:
    transmitting the unlock signal directly from the extended-reality device to the registered device, the unlock signal configured to unlock the registered device.

10. The method according to claim 1, wherein transmitting the unlock signal to enable the registered device for use includes:
    transmitting the unlock signal from the extended-reality device to an account service, which is in communication with the registered device, the unlock signal configuring the account service to unlock the registered device.

11. The method according to claim 1, further including:
    periodically sensing that the user is wearing the extended-reality device; and
    repeating detecting the candidate device in the area around the extended-reality device, broadcasting the code signal to the candidate device, detecting the visual display of the code on the candidate device to verify that the candidate device is the registered device, and transmitting the unlock signal to enable the registered device, while the user is wearing the extended-reality device.

12. An extended-reality device comprising:
    an eye-camera directed to an eye of a user;
    a world-camera directed to a field-of-view portion of an area around the extended-reality device;
    a low-range communication interface configured to transmit signals into the area around the extended-reality device; and
    a processor configured by software instructions to:
    sense that the user is wearing the extended-reality device;
    verify that the user, wearing the extended-reality device, is a registered user based on an eye-image from the eye-camera;
    detect a candidate device in the area around the extended-reality device based on a first world-image from the world-camera;
    configure the low-range communication interface to broadcast a code signal, the code signal readable only by a registered device of the registered user and including a code for visual display on the registered device; and
    detect, after broadcasting the code signal, the visual display of the code on the candidate device to verify that the candidate device is the registered device based on a second world-image of the field-of-view portion of the area around the extended-reality device captured by the world-camera.

13. The extended-reality device according to claim 12, wherein the processor is further configured to:
    configure, after verifying that the candidate device is the registered device, the low-range communication interface to transmit an unlock signal directly from the extended-reality device to the registered device, the unlock signal configured to unlock the registered device.

14. The extended-reality device according to claim 12, further including a network communication interface, and wherein the processor is further configured to:
    transmit, using the network communication interface, an unlock signal from the extended-reality device to an account service, the unlock signal configuring the account service to unlock the registered device.

15. The extended-reality device according to claim 12, wherein to sense that the user is wearing the extended-reality device, the processor is further configured to:
receive the eye-image from the eye-camera;
detect an iris in the eye-image; and
match the iris to the user to determine that the user is wearing the extended-reality device.

16. The extended-reality device according to claim 12, wherein the extended-reality device is an augmented-reality device or a mixed-reality device.

17. A method for automatically unlocking a registered device using an extended-reality device, the method comprising:
detecting a candidate device in an area around the extended-reality device using a world-camera of the extended-reality device;
broadcasting, in response to detecting the candidate device, a code signal using a low-range communication interface of the extended-reality device; and
detecting, after broadcasting the code signal, a visual display of a code on the candidate device to verify that the candidate device is the registered device, the detecting including:
capturing a world-image of a portion of the area around the extended-reality device using the world-camera of the extended-reality device;
processing the world-image to recognize the visual display of the code on the candidate device; and
transmitting, after verifying that the candidate device is the registered device, an unlock signal to enable the registered device for use.

18. The method according to claim 17, wherein broadcasting the code signal is substantially limited to the area around the extended-reality device.

* * * * *